S. SUNDERLAND.
MACHINE FOR CUTTING THE TEETH OF BEVEL WHEELS.
APPLICATION FILED AUG. 6, 1907.

908,901.

Patented Jan. 5, 1909.
6 SHEETS—SHEET 1.

Attest:
Edwd L. Potson
Edward W. Sarton

Inventor,
Sam Sunderland
By Spear, Middleton, Donaldson & Spear
Attys.

S. SUNDERLAND.
MACHINE FOR CUTTING THE TEETH OF BEVEL WHEELS.
APPLICATION FILED AUG. 6, 1907.

908,901.

Patented Jan. 5, 1909.
6 SHEETS—SHEET 2.

Attest:
Edw. L. Polson
Edward W. Sarton

Inventor,
Sam Sunderland
By Spear, Middleton, Donaldson & Spear
attys.

S. SUNDERLAND.
MACHINE FOR CUTTING THE TEETH OF BEVEL WHEELS.
APPLICATION FILED AUG. 6, 1907.

908,901.

Patented Jan. 5, 1909.
6 SHEETS—SHEET 3.

S. SUNDERLAND.
MACHINE FOR CUTTING THE TEETH OF BEVEL WHEELS.
APPLICATION FILED AUG. 6, 1907.

908,901.

Patented Jan. 5, 1909.
6 SHEETS—SHEET 4.

Attest:
Ewd L. Polson
Edward W. Sarton

Inventor,
Sam Sunderland,
By Spear, Middleton, Donaldson & Spear
Attys.

S. SUNDERLAND.
MACHINE FOR CUTTING THE TEETH OF BEVEL WHEELS.
APPLICATION FILED AUG. 6, 1907.

908,901.

Patented Jan. 5, 1909.
6 SHEETS—SHEET 5.

Attest.   Inventor.
Bent. M. Stahl.   Sam Sunderland.
Edwd L. Tolson.   By Spear Middleton Donaldson & Spear
   Atty's.

S. SUNDERLAND.
MACHINE FOR CUTTING THE TEETH OF BEVEL WHEELS.
APPLICATION FILED AUG. 6, 1907.

908,901.

Patented Jan. 5, 1909
6 SHEETS—SHEET 6.

Fig. 17.

Attest:
Ewd L. Folson.
Bent.McStahl.

Inventor;
Sam Sunderland,
by Spear, Middleton, Donaldson & Spear,
Atty's.

UNITED STATES PATENT OFFICE.

SAM SUNDERLAND, OF KEIGHLEY, ENGLAND.

MACHINE FOR CUTTING THE TEETH OF BEVEL-WHEELS.

No. 908,901.  Specification of Letters Patent.  Patented Jan. 5, 1909.

Application filed August 6, 1907. Serial No. 387,360.

*To all whom it may concern:*

Be it known that I, SAM SUNDERLAND, a subject of the King of Great Britain and Ireland, and resident of 132 Highfield Lane, Keighley, in the county of York, England, have invented a certain new and useful Improvement in and Relating to Machines for Cutting the Teeth of Bevel-Wheels, of which the following is a specification.

This invention relates to certain improvements in machines for cutting and generating the teeth of bevel gear, and one of the objects is to so arrange and combine certain parts of the machine that the setting up of the machine preparatory to commencing to cut a bevel wheel of a different angle to the one last cut is simplified by being enabled to dispense with formers, roll cones, former arms, radiating levers and the like hitherto used for obtaining a correct shape of tooth, and to attain such shape by the utilization of change gears in combination with a device for controlling the removal of what is termed "interference" at and near the point of teeth.

The invention also relates to means whereby the changing in the rotary position of wheel blank may be readily and unmistakably effected. enabling the cutting tool to act on either side of tooth as desired when generating the teeth, in a manner that when finished, the teeth are correct in shape the entire length, and point to the center of intersection, whatever may be the pitch or size of wheel blank the machine is capable of receiving.

In describing the machine in detail, reference is made to the accompanying sheets of drawings, in which—

Figs. 2, 3 and 4 show the wheel blank supporting head at right angles to the cutter slide for the purpose of simplifying the drawings.

In carrying out my invention, I mount upon a hollow or box base frame 1 of machine, a bracket 2 adapted to support vertical quadrant 3 provided with a toothed sector 3$^A$, applied in a manner as hereinafter described, and with a circular boss 4 engaging with bracket, to which it is secured in a convenient manner so that quadrant and attached sector may oscillate on said circular boss. Integral with quadrant are guide ways 5, prepared for receiving a sliding tool holder 6, reciprocated in a manner as hereinafter described, in unison with the rotary movement of quadrant and toothed sector during the generating portion of the cutting of teeth, the return movement of quadrant being effected quickly at a time when cutting tool 7 is clear of wheel blank 8.

The machine is driven from step cone 9, and near to one end of cone shaft, is secured a worm 10, meshing with a worm wheel 11, keyed to one end of shaft 12, at the opposite end of which is keyed a disk crank 13, adapted to receive an adjustable crank pin 14, to which is connected by rod 15, the reciprocating tool holder 6.

Figure 1:
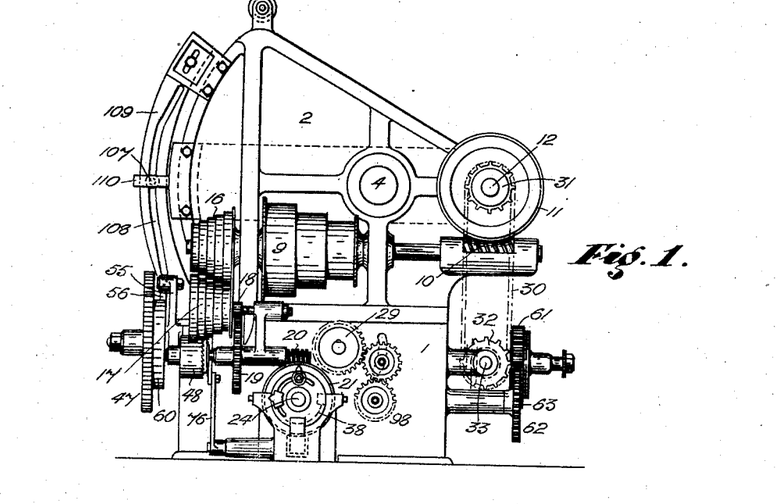
Figure 1 represents an elevation of the back or driving end of machine.
Figure 2:
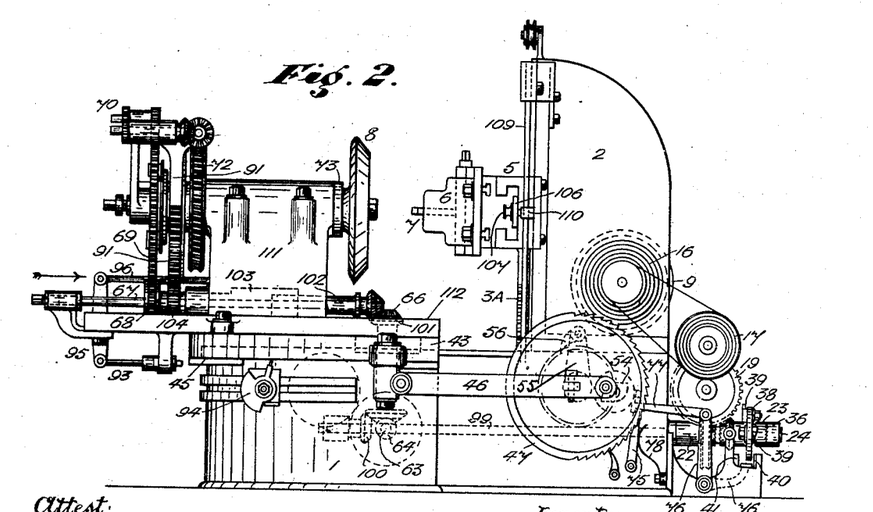
Fig. 2 a side elevation.
Figures 11, 13:
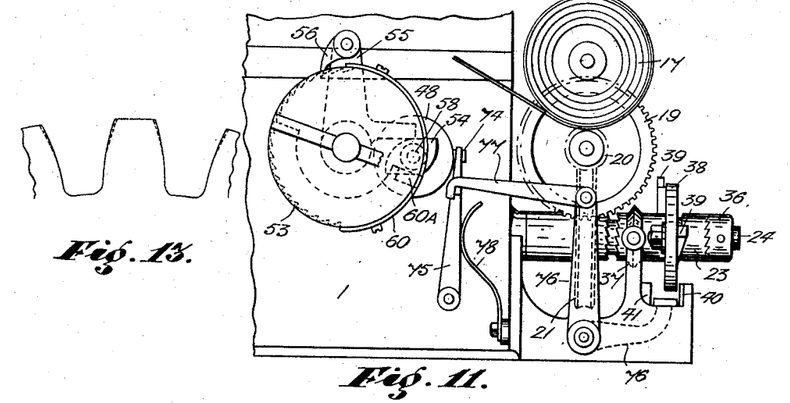
Fig. 11 an elevation showing mechanism for operating and reversing the motion of cutting slide quadrant, and means employed for actuating rocking lever, Fig. 12 a detail of sliding plate along with a portion of the vertical quadrant and toothed sector, showing connection between sector and inclined slot in plate
Fig. 13 is a view showing the shape of teeth by dotted lines as generated by the machine on the removal of what is termed "interference" or excessive thickness of teeth shown by full lines indicating the involute curve.
Figure 12:
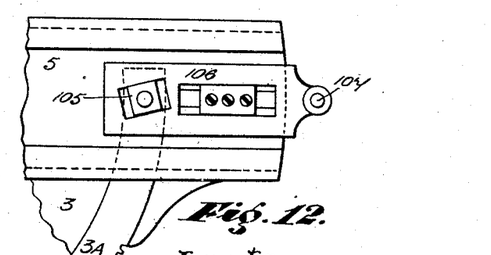

Upon the shaft of step cone 9, is secured another step cone 16, from which rotary motion is transmitted by a belt connection to cone 17 carried by a shaft to which pinion 18 is secured. This pinion meshes with a spur wheel 19, upon the shaft of which is a worm 20, meshing with worm wheel 21, secured upon a sleeve 22 provided with clutch teeth at one end. Sleeve 22 is free to rotate upon a boss projecting from the base frame 1, and passing through a hole in said boss and frame, is an inner sleeve 23, provided with two sets of clutch teeth as shown by Figs. 2 and 11. The sleeve 23 is freely supported upon a shaft 24, a reduced portion of said sleeve extending into the interior of base frame 1, within which and upon the end of the sleeve is secured a spur wheel 25, meshing with a pinion 26 secured on a shaft 27, to one end of which is keyed a pinion 28, of suitable diameter for meshing with the teeth of sector 3$^A$ applied to vertical quadrant 3, by which said quadrant is operated, and to the opposite end of shaft 27, is secured a spur wheel 29, hereinafter referred to. Rotary motion to shaft 24, may be obtained by a chain connection 30 engaging with sprocket wheels 31 and 32, the latter being secured on shaft 33 engaged with shaft 34 as shown, upon which is secured skew wheel 35 meshing with a like wheel keyed on shaft 24 below, said shaft rotating in the opposite direction to sleeve 22.

A clutch 36 is secured to one end of shaft 24, and between said clutch and sleeve 22, is placed the double clutch portion of inner sleeve 23, said sleeve being provided with a conical ring 37, also with a flange 38, both secured upon sleeve.

On each side of flange 38 is an adjustable stud 39, having an inclined surface, which as said flange revolves, one or other of the inclined surfaces come in contact with the respective rigid projections 40 or 41, by which as will be obvious, the inner sleeve 23, will be caused to slide in one direction or the other, and disengage the geared clutch, and for the apex of conical ring 37, to pass the points of conical ended spiral spring operated studs 42. When sleeve 23 is actuated in the manner described, the conical ring forces spring operated studs backwards, thereby further compressing spiral springs until the apex of said ring passes the points of studs. On the expansion of compressed spiral springs, the conical ended studs press against side of ring 37, causing inner sleeve 23 to move quickly into engagement with the opposite clutch, by which rotary motion of sleeve is reversed. When in gear with clutch 36, as shown, spur wheel 25 and pinion 28 revolve quickly and operate vertical quadrant 3 likewise, but when engaged with the other clutch at end of sleeve 22, quadrant 3 is operated slowly by worm 20 and intermediary connections, during which slow motion, the teeth of wheel blank 8 are generated.

Figure 6:
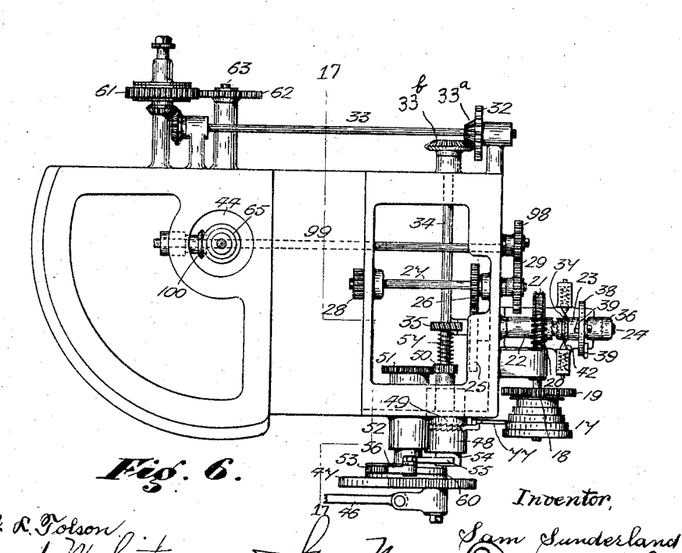
Fig. 6 is a plan showing base of machine and gearing contained therein.

The horizontal or base plate quadrant 43 is provided on the underside with a circular projection for engaging with circular hole 44, shown in plan view Fig. 6, around which the plate has a to and fro motion for some distance, and is kept in contact with the top surface of box base frame 1, by a suitable guide way 45 formed at the circumference of curved part of base 1 by a projecting flange. The quadrant is operated through rod 46 connecting said plate with crank disk 47, to which a slow and quick motion is imparted in the following manner when "gashing" the teeth spaces, the belt connection between cones 16 and 17 being then removed.

Shaft 34 has a continuous rotary motion, and near one end of same is secured a clutch 48, and free upon said shaft is a sliding sleeve 49, provided with clutch teeth at one end, and to the other end also free upon shaft is attached a spur pinion 50, meshing with wheel 51 secured on a shaft extending through boss 52, said shaft having keyed thereon disk crank 47, around one half of which are ratchet teeth 47$^a$, and around the opposite half of disk crank boss are ratchet teeth 53.

At the extreme end of constantly revolving shaft 34 is attached a tappet 54, rotated by before mentioned clutch 48, the tappet by its rotary motion actuates bell crank lever 55, giving through pawl 56 acting on ratchet teeth 53, a slow intermittent motion to disk crank 47, and to horizontal base plate 43, supporting wheel blank 8, said blank being moved slowly towards cutting tool 7, during what is termed "gashing" out the tooth spaces. When a tooth space is cut to the proper depth, a quick return motion is given to base plate 43 and attachments, obtained by allowing the teeth of sliding sleeve 49 to engage with rotating clutch 48, for one revolution each time they are allowed to engage, and when engaged, spur wheel 51 and disk crank 47, make one half of a revolution ready for the wheel blank spacing for next opening, sleeve 49 is then forced back clear of clutch 48, against the action of compressed spiral spring 57. This operation may be obtained by making shaft 34, hollow for a portion of its length, into which is inserted a bar 58 provided with a cotter 59, said cotter passing through a slot cut in shaft 34 in a position to allow cotter being always in contact with an internal surface of sleeve 49.

Figure 15:
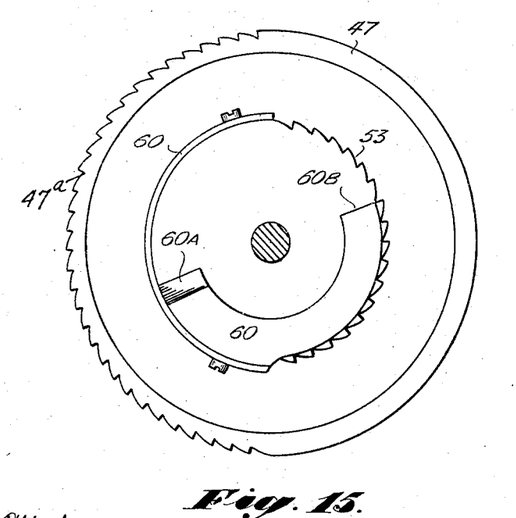
Fig. 15 is a detached elevation showing the side of disk crank next to the base frame, along with a detachable segment secured to boss of disk.
Figure 16:
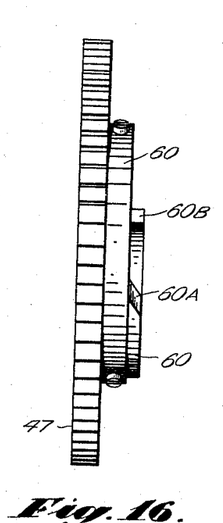
Fig. 16 is an edge view of disk crank.

To the circumference of boss of disk crank 47 is secured a detachable segment 60, covering the non-ratchet portion of boss, that is half the circumference. The segment extends towards the shaft, covering a like distance on face of boss, (see Fig. 15) the leading end of extended portion being inclined at 60$^A$, so that on rotating, when the inclined surface 60$^A$ comes in contact with the end of bar 58, the bar is gradually forced inwards, and the clutch teeth of sliding sleeve 49 disengaged with those of rotating clutch 48. When sleeve 49 and clutch 48 are disengaged, disk crank 47 continues to be rotated, this is during the gashing out of the teeth spaces, and is effected by the operation of bell crank lever 55 and attached pawl 56, and as the rotation continues, on the end of segment at 60$^B$ passing clear of end of bar 58, the bar is released and forced outwards by the expansion of compressed spring 57, thereby causing the clutch teeth of sliding sleeve 49 to engage for one revolution with those of clutch 48, by which through gears 50 and 51, disk crank 47 makes one half of a revolution quickly, and forces the wheel blank 8 clear of cutting tool. On completing the half revolution, sliding sleeve 49 is forced backwards clear of clutch teeth 48 by the inclined surface 60$^A$ acting on end of bar 58.

The spacing out of wheel blank according to pitch required, is obtained from shaft 33, driven through ordinary friction disks placed on each side of spur wheel 61, said wheel meshing with wheel 62 secured on shaft 63, at the opposite end of which is a small bevel wheel 64, meshing with a like wheel at bottom of a vertical shaft passing through and supported by a hollow shaft 65. At the top of said vertical shaft, is a small bevel wheel 66 gearing into a like wheel secured on shaft 67, upon which is feather keyed a flanged spur pinion 68, meshing with spacing wheel 69, connected by intermediary change gears 70, with worm 71, meshing with worm wheel 72, secured on hollow spindle 73, adapted to carry wheel blank 8 in the usual manner. Each time spacing wheel is liberated, it makes one complete revolution and moves wheel blank through worm wheel 72, a distance equal to the pitch of wheel being cut. On the completion of "gashing" out the spaces in wheel blank, pawl 56 is removed from engagement with ratchet teeth 53, then both movements of base quadrant 43 are effected and controlled by the engagement and disengagement of sleeve 49 with clutch 48 operated in a different manner, cone 17 being then put into rotary motion by belt attachment with cone 16.

Figure 10:
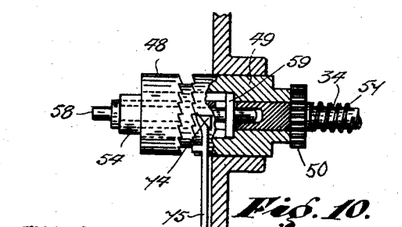
Fig. 10 an elevation of a sliding clutch partly in section.

On commencing to generate the wheel teeth, segment 60 is removed, and sleeve 49 held clear of clutch 48 when required by an inclined projecting stud 74, engaging with the inclined end of lever 75, see Fig. 10, and in order to liberate sleeve 49, lever 75 is withdrawn in the following manner.

The adjustable studs 39 secured to flange 38, project beyond the circumference of flange, and according to the direction in which the flange is making a partial rotation, one of the projections comes in contact with the bottom arm of bell crank lever 76, depressing same, and thereby through link 77, connected with lever 75, pull said lever away from stud 74, thus allowing sleeve 49 to advance by the expansion of spring 57, and engage with revolving clutch 48. At the time bell crank lever 76 is operated as described, inner sleeve 23 is moved in the direction to engage with say clutch teeth at end of sleeve 22, by which the rotation of inner sleeve 23 and flange 38 is reversed until the projection on the other stud depresses arm of bell crank lever 76, when clutch teeth on said sleeve are forced into engagement with clutch 36. On the reversal of rotary motion, bell crank lever 76 is liberated as is also lever 75 which is forced to the position shown, by a suitably applied spring such as 78.

Figure 5:
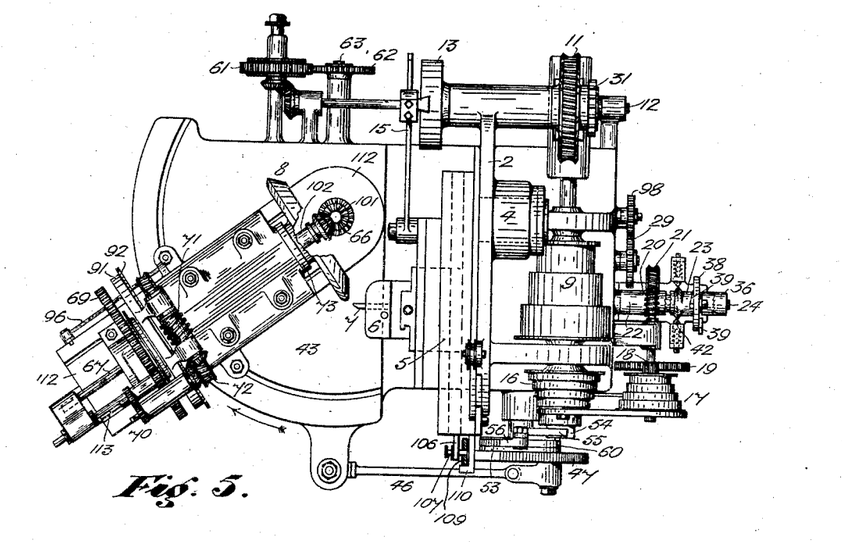
Fig. 5 is a plan with wheel blank partly broken away for the purpose of exposing the wheels below to better advantage, the supporting head being about the position occupied when cutting a bevel wheel.
Figure 7:
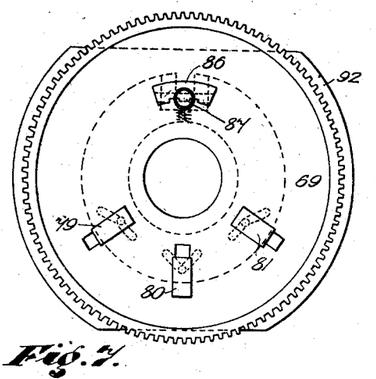
Fig. 7 an enlarged detached view of spacing wheel provided with adjustable stop plates.
Figure 8:
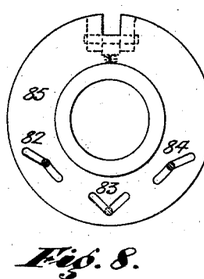
Fig. 8 a view of stop plates controlling cam.

Spacing wheel 69 is provided with three sliding stop plates, 79, 80 and 81, each having a pin to engage with its respective cam slot 82, 83 and 84, cut through plate 85, mounted freely upon wheel boss. A hole 86 is cut through spacing wheel, and is prepared with three notches for receiving a bar 87 connected to cam plate 85. When said bar is in the center notch as shown by Fig. 7, stop plate 80 is projecting further towards the circumference of wheel than the other two, and when in these positions, the spacing mechanism is set for "gashing" out, tool 7 cutting away the material from center of each tooth space, during which vertical quadrant 3 and geared connections are stationary. A pin 89 is secured to each stop plate, each pin projecting as shown for engagement with another pin 90 supported by dividing quadrant 91, the pin being attached to movable plate 92. When a space in blank has been sunk to the depth required, base plate quadrant 43 is moved in the direction of curved arrow Fig. 5, and by end of rod 93 engaging with the upper portion of movable tippler plate 94, lever 95 is operated, and top rod 96 along with disk 97, moved in the direction of straight arrow, the disk engaging with plate 92 moves it in the same direction, thereby withdrawing pin 90 clear of pin 89, by which spacing wheel 69 is liberated and rotated by friction driven wheel 61, pins 89 and 90 being then in position to engage and stop rotation on the completion of one revolution of spacing wheel.

Both edges of tool 7 are adapted to give shearing cuts, and the tool may be of any thickness less than half the inside pitch of wheel being cut. On finishing or generating the teeth, the cutting edge of tool is set to the requisite distance from center of space for the respective side of tooth to be cut, and vertical quadrant 3, through toothed sector 3$^A$, put into operation, as is also spur wheel 29, the former altering the position of cutting tool in relation to the rolling motion of wheel blank around its axis, and the latter operating the rolling motion of said blank for each cut.

The connection between spur wheel 29 and dividing quadrant 91 is through intermediate and change wheel 98, the latter being secured on shaft 99, to which is also secured a bevel wheel 100, meshing with a like wheel secured upon hollow vertical shaft 65, at the top of which is keyed a bevel wheel 101, meshing with a like wheel on one section 102 of a telescopic shaft, the other section 103 being feather keyed thereto, and to said section is secured a spur pinion 104 meshing with dividing quadrant 91, supporting worm 71, meshing with wheel 72, secured on hollow spindle 73.

Sliding stop plates 79 and 81 are each at an angle of about 55 degrees and 46 minutes with the center plate 80, and when cutting one side of the teeth, bar 87 is placed in the corresponding side notch, this alters the position of stop plates. If put into the left hand notch, stop plate 79 will be moved towards the circumference of wheel, and the other plates held nearer the center. By putting bar 87 into either of the end notches, pin 89 of respective stop plate, is brought into position for engaging with pin 90, allowing spacing wheel 69 and wheel blank to roll into position in relation to the cutting tool for generating the respective sides of teeth.

Figure 3:
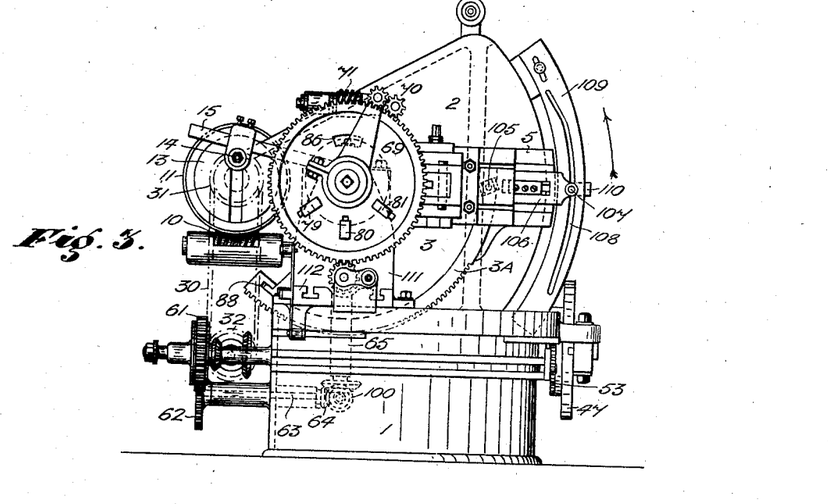
Fig. 3 an elevation looking in the opposite direction to that of Fig. 1, and Fig. 4 an elevation of the opposite side of machine to that shown by Fig. 2.

During the generating cutting of teeth, vertical quadrant 3 is moved by the aid of toothed sector $3^A$ in the direction of curved arrow in Fig. 3, the wheel blank rolling on its axis in the same direction at a corresponding speed, and when cutting one side of teeth, the cut commences at the point of each tooth, the form of tooth curvature being obtained by the gear operated rolling action of blank, coupled with the corresponding upward movement of quadrant 3, the cutting tool 7 at all times reciprocating in direct line with the point of intersection or center of cone. The generating of the other side of teeth is performed in like manner, but the cutting commences at the root of each tooth, terminating at the point, bar 87 being moved into the corresponding notch in spacing wheel 69 before commencing to cut.

Vertical quadrant 3 is provided with a toothed sector $3^a$, said sector engaging at one end with quadrant as shown, but is not rigidly secured thereto, a space 88 being left between quadrant and sector yoke, which allows of a regulated difference in the movements of sector and quadrant operated thereby. Near the other end of sector is a stud upon which is placed a die 105, engaging with an inclined slot in plate 106, said plate being attached by guide strip to quadrant, but is free to slide thereon. A pin 107 passes through said plate, the end of pin engaging with slot 108 in curved plate 109 secured to bracket 2 in a convenient manner. The outer curve of plate 109 as well as the curved center portion of slot 108, are struck from center of boss 4, the outer curved surface of plate moving in contact with retaining bar 110 connected with quadrant 3. Pinion 28 meshing with toothed sector $3^A$ is rotated as before described, the sector operating quadrant in the direction of curved arrow in Fig. 3, when tool 7 is generating the teeth, the wheel blank rolling in the same direction. The "interference" extending from imaginary pitch line to point of teeth is removed as quadrant 3 is raised, the oscillating movement of quadrant and attachments being operated by toothed sector $3^A$, through stud attached thereto, and die 105 engaging with inclined slot in plate 106 which is actuated by pin 107 engaged with slot 108. When the generating cutting commences at the root of teeth for one side, pin 107 after passing curved portion at center of slot 108, on entering the straight part towards the top, plate 106 is forced towards reciprocating tool 7, and by the inclined slot passing over die 105 supported by sector $3^A$, the upward movement of quadrant is slightly retarded, and by the wheel blank rolling on its axis at its positively regulated speed, cutting tool 7 shapes the teeth, removing a portion near the point as indicated by the dotted lines in Fig. 13, the full lines showing the true involute curve. On finishing the other side of teeth, tool 7 is adjusted and the "interference" removed by the bottom portion of slot 108 controlling through pin 107, sliding plate 106, the generating cutting for this side of teeth commencing at the point, and by pin 107 engaging with slot 108, it causes plate 106 to slide inwards, the inclined slot moving downwards over die 105, regulates by retarding the upward movement of quadrant and cutting tool. The straight portions of slot 108 at top and bottom, do not affect the shape of teeth below imaginary pitch line.

The supporting head 111 mounted in guide ways upon plate 112 secured to 43, is moved to the position required to suit the diameter of wheel blank in relation to cutting tool 7, by the operation of screw 113, the before mentioned telescopic shaft and feather keyed pinion 68 allowing such movement.

The machine as thus described operates in the following manner:—Blank 8 is secured upon a spindle to which worm wheel 72 is also secured, and during the gashing out or cutting of each tooth space, blank 8 does not rotate, but is moved towards reciprocating tool 7, a distance equal to each cut, until the depth of tooth space is obtained. During the gashing out of each tooth space, vertical quadrant 3 is stationary, cone 17 being also at rest, and the clutch teeth of sleeve 23 disengaged from clutch 36. The movement of blank 8 towards reciprocating tool 7 is accomplished by causing disk 47 to rotate slowly one half of a revolution, during which movement base plate quadrant 43 and blank 8 are intermittently drawn towards tool 7, the full depth of a tooth space being cut when rod 46 is in the horizontal position, as shown by Fig. 2. The boss of disk 47 is provided with ratchet teeth 53, see Figs. 6 and 13. These teeth are opposite to those on disk 47, and engaging with teeth 53 is a pawl 56 actuated by tappet 54 operated by shaft 34. This gives a slow intermittent rotary motion to disk 47 during the cutting of a tooth space. The unlettered pawl shown in Fig. 2 is for the purpose of preventing disk 47 moving backwards when pawl 56 is passing from one tooth to another, and as disk 47 is directly driven during the other half revolution as described in next paragraph, there is no need for ratchet teeth beyond one half the circumference of 47. When a tooth space is cut to the depth, base plate quadrant 43 is moved quickly in the direction of the curved arrow, see Fig. 5, affected by the sliding clutch 49 engaging with rotating clutch 48, thereby operating spur pinion 50 meshing with wheel 51 of double diameter causing same and disk 47 to make one half of a revolution and move blank 8 clear of tool 7. The sliding of clutch 49 is controlled by a bar 58 engaging with detachable segment 60, and a spring 57 compressed between fixed skew wheel 35 and sliding pinion 50 attached to 49. When blank 8 is moved clear of tool 7, the next operation is the rotation of blank 8 a distance equal to the pitch being cut, effected from rotating shaft 33 through friction gear 61, bevel gears 64 and 66, pinion 68, spur wheel 69 and gear connections with worm wheel 72.

Figure 9:
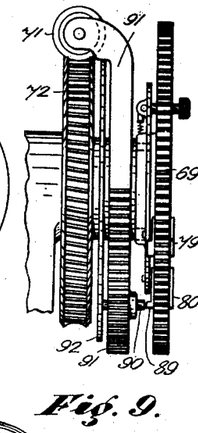
Fig. 9 a side elevation of the spacing and dividing wheels.

All the intermediate connections between wheel 61 and worm wheel 72 are friction driven by 61, the rotation of the intermediate connections and 72 being prevented so long as pins 89 and 90 are engaged. In Fig. 9 pin 90 is shown withdrawn clear of 89 for allowing the gears to rotate and move blank 8 the required distance.

Friction drives such as shown by Fig. 6 are common in this case consisting of a spur gear 61 mounted free upon the supporting shaft. On each side of 61 is a flange secured upon said shaft, and between one or both flanges and gear 61 is a leather disk pressed against the side of gear 61 sufficiently tight that when pins 89 and 90 are clear, as shown by Fig. 9, the disks, shafts, and gear connections to worm wheel 72 are rotated.

Figure 14:
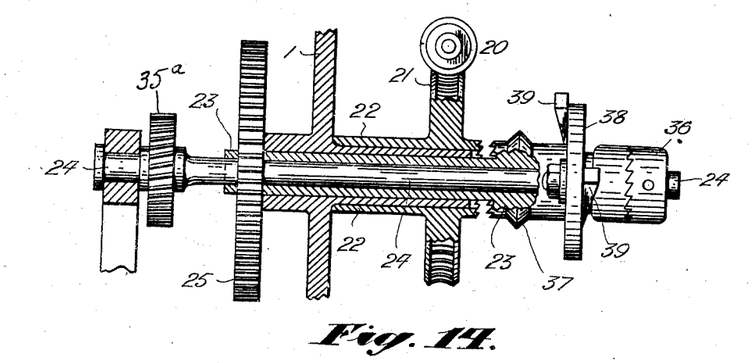
Fig. 14 is an enlarged sectional elevation through a portion of base frame of machine showing a boss integral therewith, adapted to support sleeves rotating in opposite directions.
Figure 17:
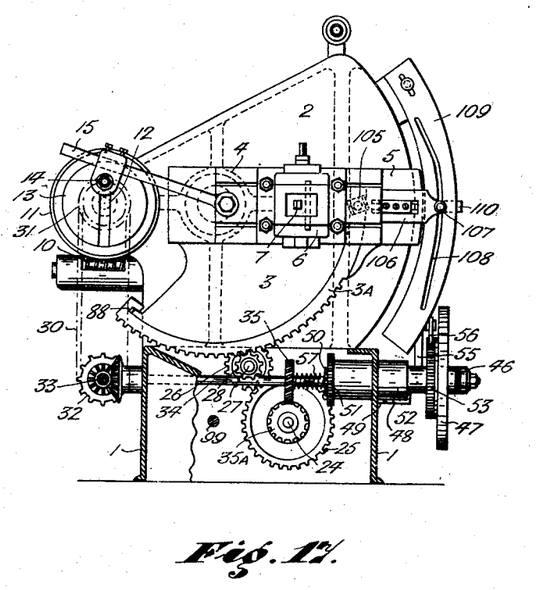
Fig. 17 represents a section of base box frame 1 through irregular line 17—17 of Fig. 6.

The following relates to generating or finishing of the teeth. After all the teeth spaces are cut in blank 8, segment 60 is removed from boss of disk 47, and pawl 56 removed out of engagement with ratchet teeth 53, the rotation of spur gear 51 and thereby disk 47 at intervals is controlled in a different manner while the teeth are being generated or cut to the correct form. Cone 17 is put into operation, rotating sleeve 22 slowly in one direction, and when the clutch teeth of said sleeve are meshing with the clutch teeth of sliding sleeve 23, pinion 28 is rotated through gears 25 and 26, during which time vertical segment 3 is moved slowly in the direction of curved arrow in Fig. 3, and tool 7 shaping one side of a tooth, a slight rolling motion being given to blank 8 through wheel 29, shaft 99, bevel gears 101 and pinion 104 meshing with quadrant 91. When one side of a tooth is finished, lever 75, Fig. 11, is drawn clear of stud 74 secured to sliding clutch sleeve 49, said stud being provided with an inclined surface, see Fig. 10. This withdrawal allows clutch 49 to engage with the rotating clutch 48 for one revolution, causing disk 47, through gears 50 and 51, to make one half of a revolution and move blank 8 away clear of reciprocating tool 7. When the blank is thus moved, sleeve 23 is engaged with clutch 36, see Figs. 11 and 14, the clutch is secured to shaft 24 rotated by skew gears 35 and 35^A, see Fig. 17. Shaft 24 rotates in the opposite direction to sleeve 22, thus operates quadrant 3 in the opposite direction to curved arrow in Fig. 3 and during the downward movement of quadrant 13 blank 8 will have moved a distance equal to the pitch of the teeth being cut, effected by wheel 69 making one revolution on the disengagement of pins 89 and 90. Lever 75 is then again withdrawn from inclined surfaced stud 74, and disk 49 rotated another half revolution, bringing the blank into position for tool 7 to act upon another tooth, the clutch teeth of sleeve 23 then engaging with the teeth of sleeve 22. These operations are repeated until all the teeth are finished on one side, after which tool 7 is adjusted to act upon the opposite side of the teeth, and the generating or finishing carried out in the same manner.

Figure 4:
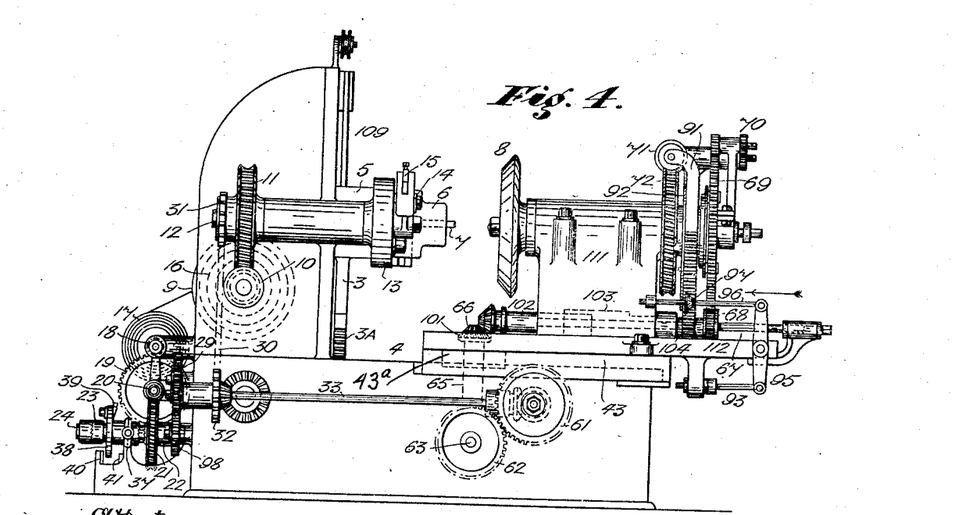

Guide way 45 is shown by Fig. 2. It is a projecting flange at top of box base frame 1, with a plate secured to the underside of base quadrant 43. It is also shown by Fig. 3, but no numerical reference is made, and it is more clearly shown by dotted lines in Fig. 4; in this case also without a reference number.

What I claim as my invention is:—

1. In a machine for generating the teeth of bevel wheels, a toothed sector, means for operating the same, a die 105 supported by said sector, a sliding plate 106 engaged by said die, an oscillating vertical quadrant 3 attached to said plate and provided with guide ways, a reciprocating cutting tool in said ways, means for operating the tool, a curved slotted plate 109, a pin connecting the sliding plate with the slot of said plate 109, a spindle adapted to support a wheel blank, means for rotating the spindle, means for intermittently moving the blank into position for the tool to engage therewith when generating and clear thereof when spacing.

2. In a machine for cutting wheel teeth, spacing mechanism comprising a pinion 68, a wheel 61 rotating said pinion at intervals, means for frictionally driving said wheel 61, a worm wheel 72, a wheel 69 with which the pinion meshes, change gears connecting said wheel 69 with the worm wheel 72, a wheel blank spindle carrying said wheel 72, a plate 85 on the wheel blank spindle having cam slots therein, sliding stop plates adjacent the plate 85 provided with pins engaging with the cam slots in plate 85, means for operating the same, a movable plate 92 with pin 90, means for sliding said plate and liberating the wheel 69, and means for stopping the rotation of wheel on the completion of one revolution.

In witness whereof I have hereunto set my hand to this specification in the presence of two witnesses.

SAM SUNDERLAND.

Witnesses:
   JOHN GILL,
   A. M. MIDGLEY.